United States Patent [19]

Meyer et al.

[11] 4,038,486
[45] July 26, 1977

[54] SUPPORTING INSULATOR ASSEMBLY FOR GAS-INSULATED EQUIPMENT

[75] Inventors: Jeffry R. Meyer, Pittsburgh; John S. Billings, Jr., Trafford, both of Pa.

[73] Assignee: Westinghouse Electric Corporation, Pittsburgh, Pa.

[21] Appl. No.: 585,729

[22] Filed: June 10, 1975

[51] Int. Cl.² .............................................. H01B 9/06
[52] U.S. Cl. ...................................... 174/28; 174/13; 174/16 B
[58] Field of Search ............... 174/13, 16 B, 28, 99 R, 174/99 B

[56] References Cited

U.S. PATENT DOCUMENTS

| | | | |
|---|---|---|---|
| 3,345,450 | 10/1967 | Spindle | 174/28 |
| 3,610,807 | 10/1971 | Whitehead | 174/13 |
| 3,652,778 | 3/1972 | Sakai | 173/28 |
| 3,767,840 | 10/1973 | Cronin | 174/13 X |
| 3,786,169 | 1/1974 | Floessel | 174/13 X |
| 3,786,170 | 1/1974 | Floessel | 174/13 X |
| 3,786,174 | 1/1974 | Floessel | 170/13 X |
| 3,809,795 | 5/1974 | Olsen et al. | 174/28 |
| 3,886,301 | 5/1975 | Cronin | 174/13 X |

FOREIGN PATENT DOCUMENTS

| | | | |
|---|---|---|---|
| 858,102 | 11/1940 | France | 174/13 |

*Primary Examiner*—Arthur T. Grimley
*Attorney, Agent, or Firm*—W. R. Crout

[57] ABSTRACT

An improved supporting insulator assembly is provided for high-voltage metal-enclosed gas-insulated equipment. The supporting insulator assembly is preferably cast onto the inner high-voltage conductor by improved attachment means, and the inner high-voltage gradient conditions are controlled around the inner high-voltage conductor, or bus by an improved shielding construction.

Additionally, an improved construction provides an expansion joint so as to allow axial longitudinal movement of the inner high-voltage conducting elements relative to the outer grounded metallic sheath, or casing due to differences in temperature and coefficients of thermal expansion therebetween.

An additional feature of the invention is the improved connection of the supporting insulator structure with adjacent high-potential components.

Another important feature of the present invention is the truncated configuration of the supporting insulator assembly.

2 Claims, 4 Drawing Figures

4,038,486

SUPPORTING INSULATOR ASSEMBLY FOR GAS-INSULATED EQUIPMENT

CROSS-REFERENCES TO RELATED APPLICATIONS

Reference may be made to U.S. patent application filed Nov. 11, 1974 Ser. No. 522,960 by Otto H. Soles et al., and assigned to the assignee of the present application. Also reference may be made to U.S. patent application filed Sept. 17, 1974, Ser. No. 506,911 by John S. Billings, Jr., et al., now U.S. Pat. No. 3,949,157 issued Apr. 6, 1976, and also assigned to the assignee of the instant patent application.

BACKGROUND OF THE INVENTION

The use of gas-insulated high-voltage equipment for electrical transmission purposes is quite old. Reference may be made, for example, to U.S. Pat. No. 3,856,978, issued Dec. 24, 1974 to Andreas M. Sletten and Alan H. Cookson, and assigned to the Westinghouse Electric Corporation. In this patent are set forth certain prior-art background patents relating to high-voltage component parts utilized in gas-insulated equipment. The advantages of such gas-insulated equipment are set forth in the following U.S. Pat. Nos.: 3,700,840 — Wilson et al; 3,694,592 — Kuhn; 3,610,807 — Whitehead; Canadian Pat. No. 904,412 — Trump; U.S. Pat. No. 3,348,001 — Upton et al; and U.S. Pat. No. 3,378,731 — Whitehead.

SUMMARY OF THE INVENTION

An improved insulating support member of generally conical, or truncated configuration is provided being, preferably, cast onto the inner high-voltage conductor, or bus, the inner high-voltage conductor, or bus having an improved attachment-surface configuration to control the inner voltage gradient conditions thereabout.

The insulator support assembly may, additionally, provide an expansion joint enabling ready axial contracting movement of the inner conductors provided centrally within the outer grounded metallic sheath, or casing with a suitable insulating gas providing insulation therebetween for insulation purposes.

Additional novel features of the invention include an improved encompassing shield surrounding the inner high-voltage conductors at the expansion joint location to relieve the voltage gradient thereat. Other features include the disposition of the conically, or truncated-shaped insulator support at a junction place, or termination point, whereby, for shipment purposes, an end flat closure plate may be employed. High-voltage component elements may readily be attached to the improved insulator assembly.

DESCRIPTION OF THE PREFERRED EMBODIMENTS

Figure 1:
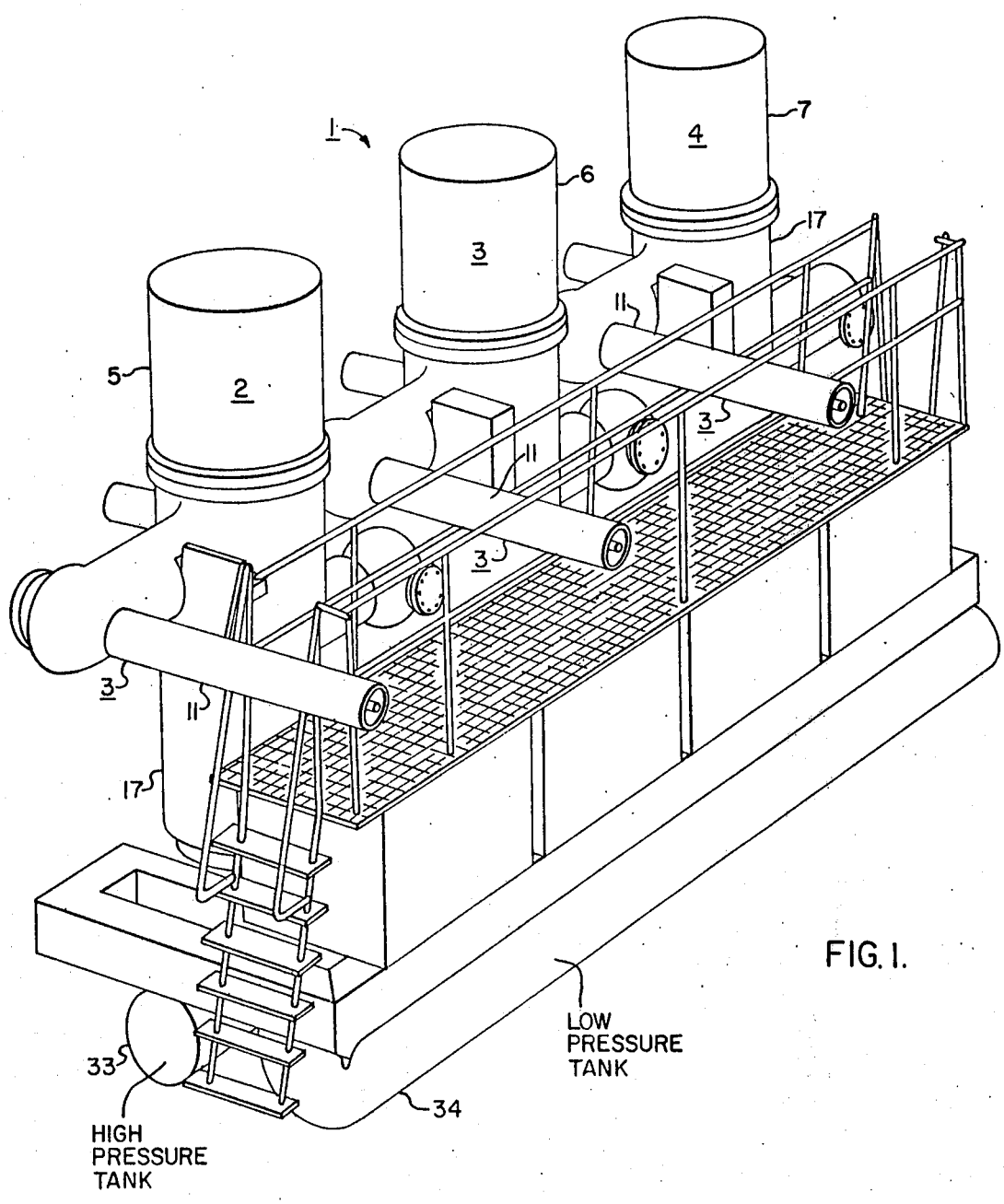
FIG. 1 is a perspective view of gas-insulated high-voltage station equipment utilizing component parts which embody features of the present invention.

With reference to FIG. 1 of the drawings, it will be observed that there is provided a gas-insulated substation equipment 1 utilizing a plurality of circuit-breaker units 2, 3 and 4, which are enclosed within outer grounded casing structures 5, 6 and 7. Preferably, a suitable insulating gas 8, such as sulfur-hexafluoride ($SF_6$) gas, is utilized at a pressure, say, for example, 45 p.s.i.g. The construction of the circuit-breaker pole-units 2, 3, and 4 is set forth in the aforesaid U.S. patent application Ser. No. 522,960, the teachings of which are incorporated herein by reference. For the purpose of understanding the present invention, however, it is not necessary to know the detailed construction and operation of the circuit-breaker components 2, 3, or 4, and reference may be had to the aforesaid U.S. patent application Ser. No. 522,960 for an understanding of the operation of the pole-units 2, 3 and 4.

Figure 2:
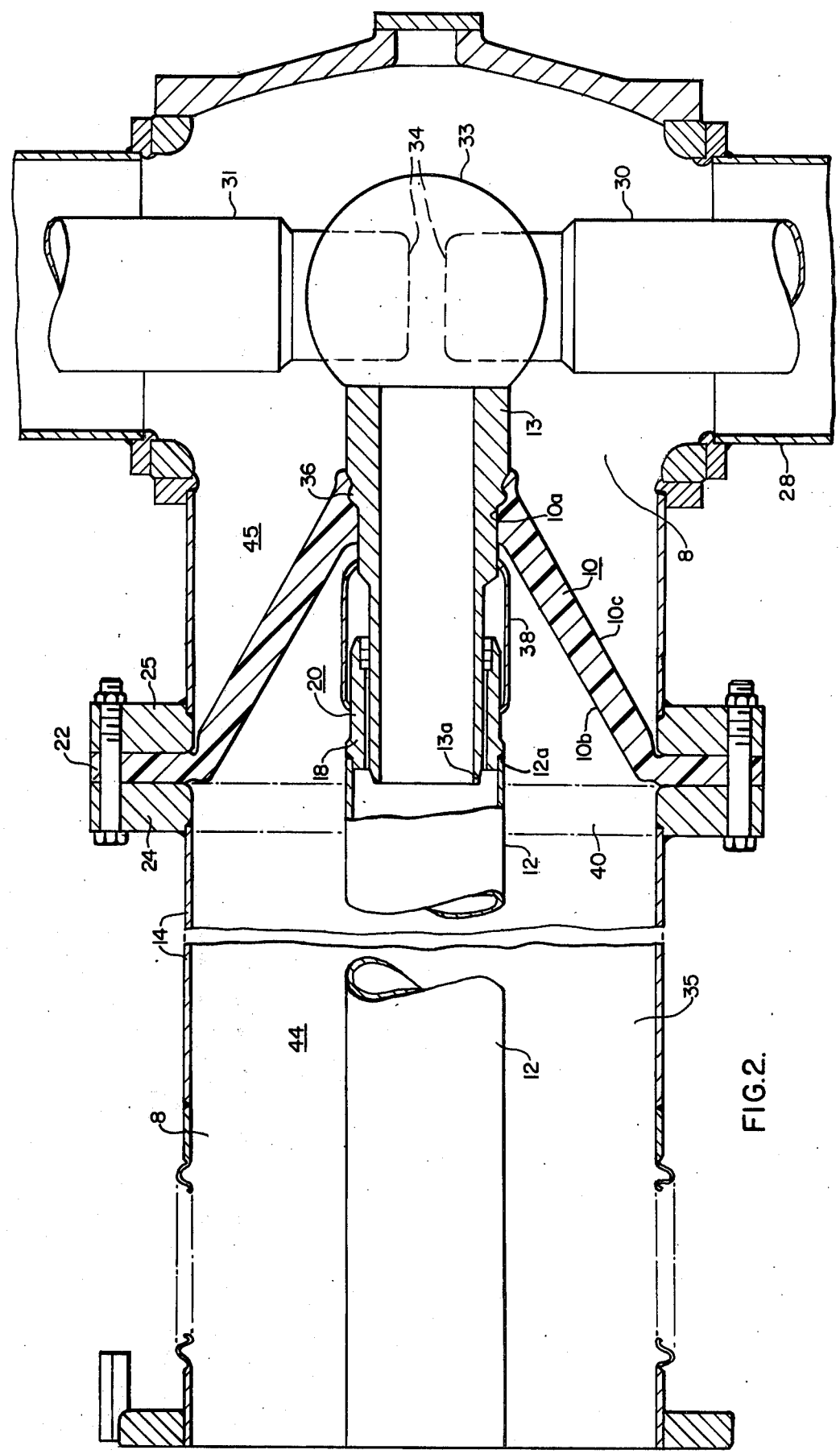
FIG. 2 is an enlarged axial vertical-sectional view taken through one embodiment of the present invention, illustrating its use in connection with a connecting junction box.

The present invention is, however, particularly concerned with the insulating spacer elements 10 illustrated in FIG. 2, which assist in supporting and maintaining the high-voltage inner conductors, or bus-sections 12, 13 within the outer grounded metallic sheaths, or casing sections 14, 15. As is well known by those skilled in the art, the transmission pipes 14, 15 comprise an outer grounded metallic sheath, or metallic casing at ground potential, interiorly of which is disposed the high-voltage conductor, or bus 12, 13 and a good insulating gas 8 is provided therebetween.

With reference to FIG. 2 of the drawings, it will be observed that there is provided an inner high-voltage conductor, or bus 12 of tubular configuration having at one end 12a thereof a sleeve-like contact 18, interiorly of which projects a companion metallic tubular high-voltage conductor, or bus 13. Thus, there results an expansion joint 20 permitting desirable sliding contact between the sleeve-like contact 18 and the end periphery 13a of the companion high-voltage conductor or bus 13.

An insulating support insulator is provided, designated by the reference numeral 10, and being of generally conical, or truncated configuration, having an outer peripheral flange portion 22 interposed between the end metallic flanges 24, 25 of the tubular casing members 14 and 15. The casing member 14 is of relatively long length, whereas the metallic grounded tubular casing member 15 terminates in a spherical junction box 28. Within the junction box 28 may terminate one or more inner bus, or high-voltage inner conductors 30, 31 as more clearly illustrated in FIG. 2.

Interiorly of the junction box 28 is the inner contact sphere 33, which comprises a number of contact recesses 34, into which project the inner bus-sections 30, 31, as illustrated in FIG. 2. A suitable insulating gas 8, such as sulfur-hexafluoride ($SF_6$) gas, is interposed in the annular space 35 between the outer grounded metallic casing members 14, 15 and the interiorly-disposed axially-located bus, or conductors 12, 13.

In high-voltage metal-enclosed gas-insulated equipment, cast-resin insulators are used to support the high-potential inner conductors 12 or 13. Gas-insulated systems are optimized for practical economic purposes such that significant mechanical and electrical requirements are placed upon the support insulators 10.

One of the most critical areas where support insulators are used is in the gas-insulated isolator switch. In that application, the insulator must provide mechanical support of the inner conductor and attached high-potential elements in all six degrees of freedom. It must also provide a gas barrier between the isolator and the attached components. Provisions must be made so that the electrical stresses in the gas 8 adjacent to the insulator 10, on its surface, and within its bulk, are held to safe limits. Means must be provided also for attachment of adjacent high-potential elements to the element 13 supported by the insulator 10.

This invention describes a novel design of a support insulator assembly 10 for use in metal-enclosed gas-insulated station equipment 1. The design encompasses a grounded metallic cylindrical outer sheath 14, 15, inside of which and concentric to which is supported a high-potential inner conductor 12, 13 by means of a cast-resin support insulator 10.

As shown in FIG. 2, a support insulator 10 is cast directly to a specially-shaped attachment surface 36 on the inner conductor 13. The shape of the attachment surface 36 serves to influence the voltage gradient along the inner surface 10a of the insulator 10, so that the voltage gradient is quite low at the point where the insulator surface 10a meets the inner conductor 13. It also provides mechanical bracing for the insulator and it improves the gas barrier at the insulator conductor interface. A judiciously-shaped and placed shield 38 serves also to limit the voltage gradient at that point. The inner conductor 13, on which the insulator 10 is cast, extends to form the male part 13a of an expansion joint 20 on the one end, and on the other end an attachment point for other high-potential elements. The insulator 10 may be held in place at its periphery 22 according to the construction, as proposed in patent application (W.E. No. 45,894).

The novel configuration proposed by the present invention shows considerable improvement over the prior art for the following reasons:

1. The design provides secure mechanical attachment of the insulating resin to the inner conductor 13.
2. The design allows the supporting insulator 10 to be cast directly onto the inner conductor 13.
3. The design provides excellent control of voltage gradient inside the insulator body 10, along the insulator surface 10b, 10c, and in the adjacent insulating gas 8.
4. The inner conductor design allows for simple connection of other high-potential elements.
5. The inner conductor design allows for the mounting of a simple flat cover plate 40 for shipping purposes, when the insulator assembly 10 is mounted as part of a gas-insulated component.
6. The expansion-joint design 20 allows for movement of attached high-potential elements with respect to the outer sheath 14, 15 due to differences in temperatures and coefficients of thermal expansion.
7. The shield arrangement 38 provides electrostatic shielding of the expansion joint 20 such that there is no deleterious change in the electric field influence regardless of relative displacement of the members of the expansion joint 20.
8. The shield arrangement 38 provides a zero electric field region in which particles created in the expansion joint are trapped, and, therefore, not allowed to degrade the dielectric strength of the gas adjacent to the insulator 10.
9. The insulator assembly 10 provides a good gas barrier between the gas regions 44, 45.
10. The insulator assembly 10 may be used as an inner conductor support at the entrance of many different high-potential elements, such as straight sections of bus, elbows, tees, junction boxes, isolator switches, magnetizing-current switches, bushing, and circuit-breakers.

We would also like to claim the advantages of the insulator configuration as it approaches the outer metal sheath; that the specific shape precludes high voltage gradients at the interfaces between the flange faces, and the support insulator. That is, the insulator surfaces intersect the flange faces at nearly right angles, and the "knee" on the outer surface of the insulator tends to reduce the voltage in the gap between the insulator and the flange.

Figure 3:
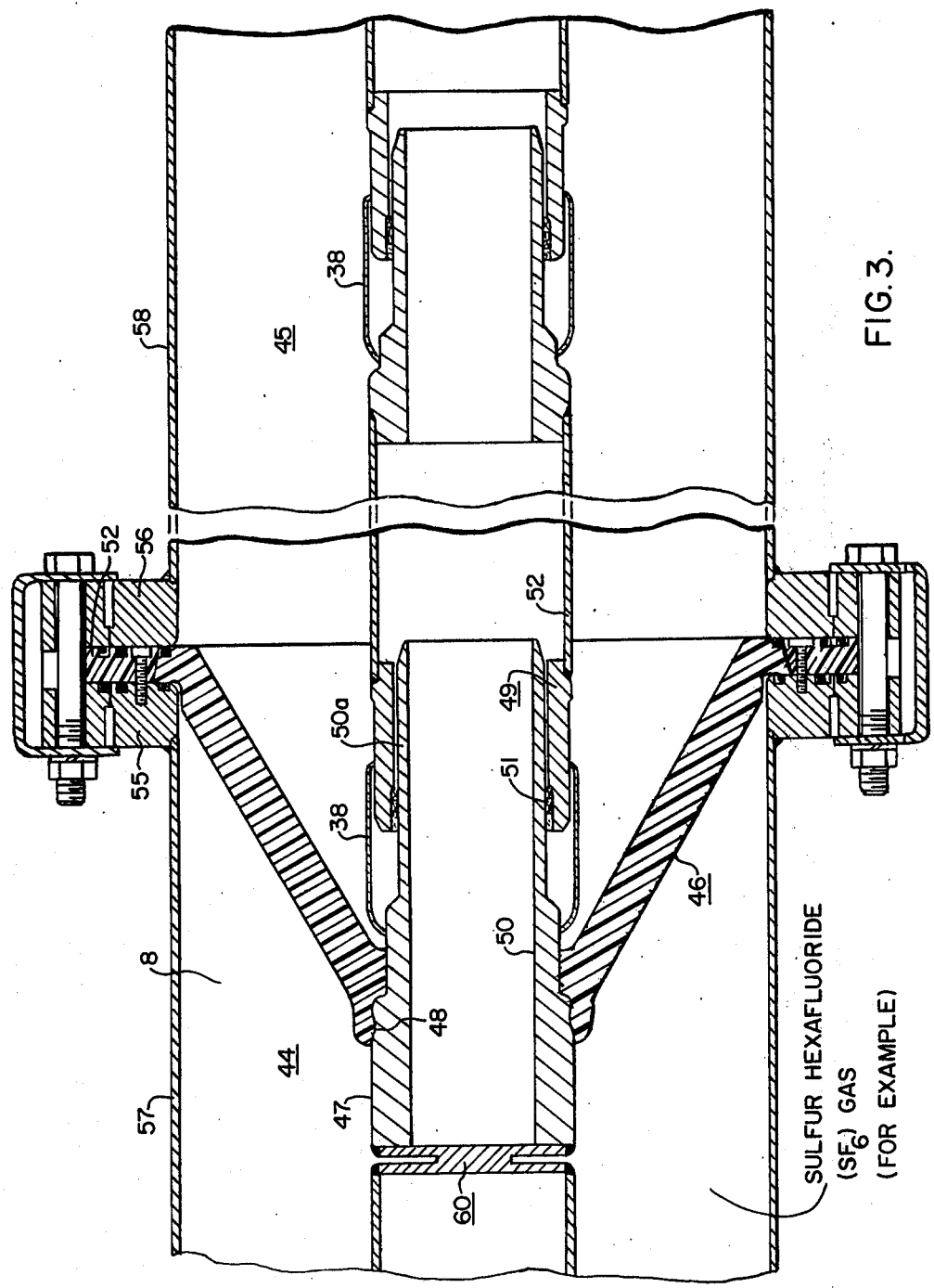
FIG. 3 illustrates still another form of the present invention again illustrating a sliding expansion-joint assembly; and, FIG. 4 illustrates a sectional view taken substantially along the line IV—IV of FIG. 2, illustrating the adaptability of the present invention for the connection of related high-voltage components.

FIG. 3 illustrates another embodiment of the invention in which again the insulating support insulator 46 is of conical, or truncated configuration, and is cast to the inner high-voltage conductor 47, the latter again having attachment surfaces 48.

Again in FIG. 3 there is provided an expansion joint 49 resulting from the cooperation between the tubular end portion 50a of the inner conductor, or bus 50 and the annular contact portion 51 of the companion bus-section 52.

Again, the conically-shaped insulator support 46 has an outer flange portion 52, which is interposed between the confronting flange portions 55, 56 attached to the ends of the metallic casing sections 57 and 58. A coupling flex-plate 60 is provided enabling a realignment of the inner high-voltage conductor 50, which construction is set forth and claimed in United States patent application filed June 6, 1975, Ser. No. 584,432 by Jeffry R. Meyer (W.E. No. 45,936).

Figure 4:
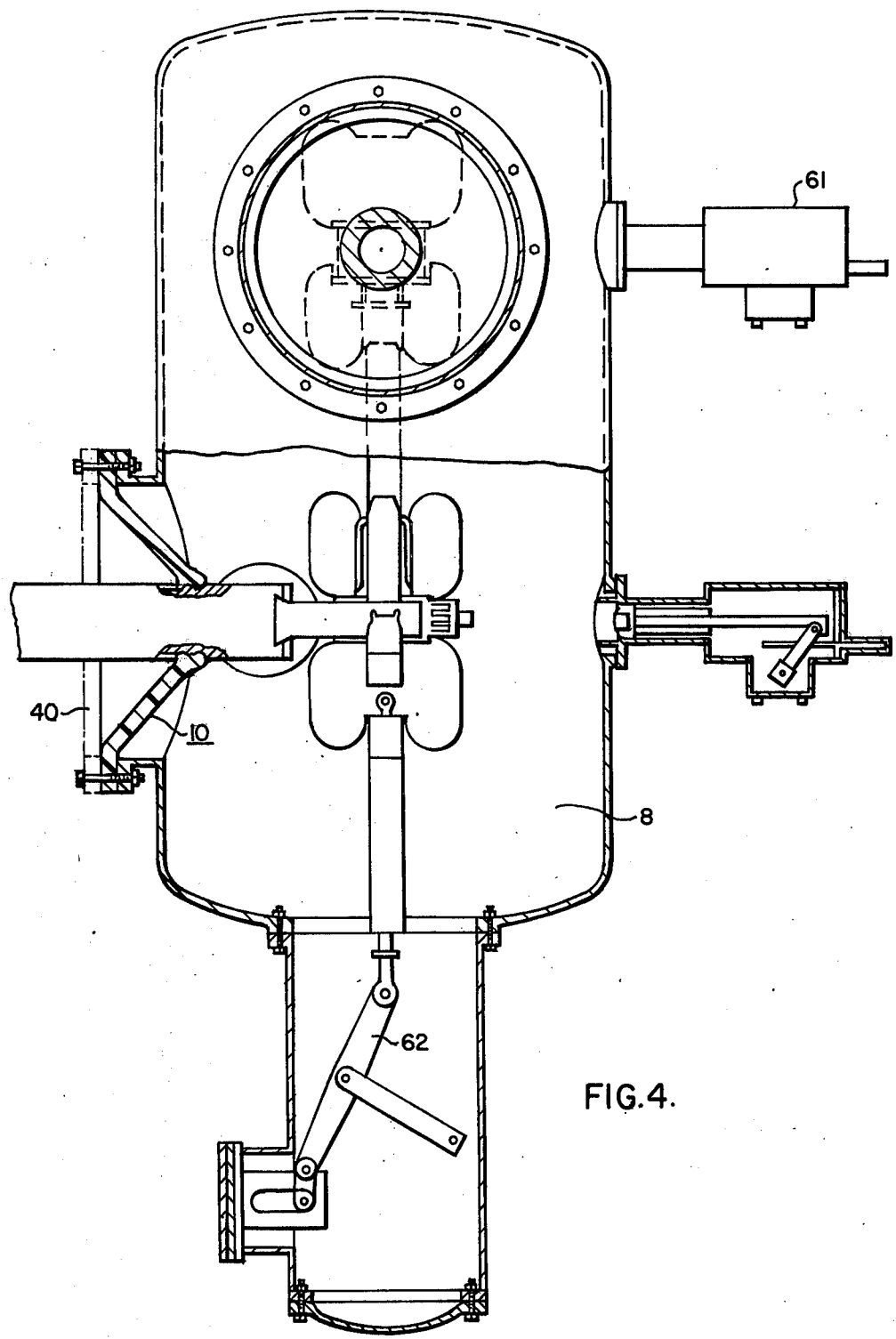

FIG. 4 illustrates a cross-sectional view taken through an isolating switch and illustrates the cooperation therewith of a grounding switch 61 and a disconnecting switch 62. The ground switch 61, for example, is manually operated, and is a single-pole switch designed to be located at the cable-pothead position, or on incoming line air bushings, power-transformer bushings, or junction boxes. The disconnecting switch 62 is a single-break single-phase slow-speed device, which may, if desired, be motor-operated. Again the use of the conical or truncated insulators 10, 46 and their gradation of the voltage is illustrated.

It will be observed that the shielding element 38, which, for example, may be of spun construction covers the expansion joint 20, and relieves the voltage stress at the inner high-voltage conductor, or bus-section 12, 13.

The shielding element 38 may be of spun or drawn construction such that the inwardly turned end nearest the support insulator is sized to an interference fit with the inner conductor 13. Thus, the shield may be easily forced into place where it is securely mechanically and electrically anchored. The outer curved surface of the shield 38 is judiciously shaped to cover the expansion joint 20, and relieve the voltage stress on the inner surface of the support insulator 46, and the inner high voltage conductor, or bus section 12, 13. The end of the shield farthest from the support insulator 46 is treated with an abrasion resistant coating to relieve the voltage gradient on the end of the shield and to protect the inner conductor 12 from abrasion in case of misalignment.

Although there have been illustrated specific structures, it is to be clearly understood that the same were merely for the purpose of illustration, and that changes and modifications may readily be made therein by those skilled in the art, without departing from the spirit and scope of the invention.

What we claim is:

1. A gas-insulated transmission-line including, in combination:
    a. means defining an outer-disposed grounded metallic casing;
    b. an interiorly-disposed high-voltage metallic transmission-line conductor located generally along the axis within said outer grounded casing;
    c. a supporting insulator assembly for fixedly supporting said inner high-voltage, transmission-line conductor and cast to said inner high-voltage transmission-line conductor; and
    d. the inner high-voltage, transmissiion-line conductor having an annular protruding metallic attachment surface (48) at the casting location and moreover cast therein to reduce high-gradient voltages within the insulating body-portion of said insulator-support assembly and to provide, additionally, secure mechanical bonding of said insulator assembly to said inner high-voltage conductor.

2. The combination according to claim 1, wherein a companion, inner high-voltage conductor is provided making sliding expansion and contracting engagement with said first-mentioned inner high-voltage conductor, and an encompassing metallic shield being provided around the mating line between said two inner high-voltage conductors to grade the voltage outwardly therefrom.

* * * * *